United States Patent

Riefe et al.

[11] Patent Number: 6,138,525
[45] Date of Patent: Oct. 31, 2000

[54] MOTOR VEHICLE STEERING COLUMN AND METHOD

[75] Inventors: Richard Kremer Riefe, Saginaw; James Salois, Midland, both of Mich.

[73] Assignee: Delphi Technologies, Inc., Troy, Mich.

[21] Appl. No.: 09/306,336

[22] Filed: May 6, 1999

[51] Int. Cl.$^7$ .................................................. B62D 1/18
[52] U.S. Cl. ......................... 74/493; 280/775; 267/174; 16/277
[58] Field of Search ............................... 74/493; 280/775; 267/170, 174, 179; 16/277, 286, 304, 305, 306

[56] References Cited

U.S. PATENT DOCUMENTS

| | | | |
|---|---|---|---|
| 716,709 | 12/1902 | Hershey | 74/493 |
| 1,731,001 | 1/1929 | Rasmussen | 74/493 |
| 2,214,163 | 9/1940 | Frees | 74/493 X |
| 2,779,208 | 1/1957 | Pittman et al. | 74/493 |
| 3,199,625 | 8/1965 | Liebreich | 74/493 X |
| 3,503,601 | 3/1970 | Wells | 267/174 X |
| 3,827,105 | 8/1974 | Branchaud | 16/277 X |
| 4,195,535 | 4/1980 | Broucksou | 74/493 |
| 5,027,674 | 7/1991 | Nolte et al. | 74/493 |
| 5,035,446 | 7/1991 | Arvidsson | 280/775 |
| 5,477,744 | 12/1995 | Hoblingre et al. | 74/493 |

*Primary Examiner*—David A. Bucci
*Assistant Examiner*—Colby Hansen
*Attorney, Agent, or Firm*—Edmund P. Anderson

[57] ABSTRACT

A tilt-adjustable motor vehicle steering column including a stationary mast, a tilt housing supported on the mast jacket for up and down pivotal movement, an articulated steering shaft having a lower portion rotatably supported on the mast jacket and an upper portion rotatably supported on the tilt housing, a steering hand wheel on the upper portion of the steering shaft, and a long composite balance spring preloaded in compression flexure between the tilt housing and the mast jacket. The composite balance spring consists of a hinge and a pair of short helical coil springs on opposite sides of the hinge. To preload the composite balance spring in compression flexure, the short coil springs are first arrayed as straight sides of a "V" between respective ones of a pair of spring seats on the mast jacket and the tilt housing. Then, when the hinge is thrust laterally to align the short coil springs on a longitudinal centerline of the composite balance spring between the spring seats, the hinge closes and the helical coil springs are compressed longitudinally without buckling. A latch automatically locks the hinge closed to reinforce the middle of the composite balance spring against lateral buckling.

8 Claims, 2 Drawing Sheets

MOTOR VEHICLE STEERING COLUMN AND METHOD

TECHNICAL FIELD

This invention relates to a tilt-adjustable steering column for a motor vehicle.

BACKGROUND OF THE INVENTION

A typical tilt-adjustable motor vehicle steering column includes a stationary mast, a tilt housing supported on the top of the mast jacket for up and down pivotal movement, an articulated steering shaft having a lower portion rotatably supported on the mast jacket and an upper portion rotatably supported on the tilt housing, and a steering hand wheel on the upper portion of the steering shaft. Up and down pivotal movement of the tilt housing adjusts the vertical position of the steering hand wheel. Commonly, the steering column further includes a balance spring between the tilt housing and the mast jacket which minimizes the manual effort required for upward adjustment of the position of the steering hand wheel by biasing the tilt housing toward an upper limit position. Because the balance spring is necessarily located close to the longitudinal centerline of the steering column and because the tilt housing and the structural elements thereon are relatively heavy, the balance spring is usually a long helical coil spring trapped or preloaded in compression flexure between the mast jacket and the tilt housing. In some prior tilt-adjustable steering columns, preload compression flexure of the long balance spring is attained by arching the balance spring between spring seats on the tilt housing and the mast jacket and then thrusting the middle of the spring laterally between the spring seats. In other prior tilt-adjustable steering columns, preload compression flexure of the long balance spring is attained by compressing the balance spring longitudinally against a spring seat on the mast jacket through a bore in the tilt housing and then inserting a twist-lock style retainer in the bore behind the compressed balance spring. A tilt-adjustable motor vehicle steering column and method according to this invention are novel alternatives to such prior tilt-adjustable motor vehicle steering columns and methods.

SUMMARY OF THE INVENTION

This invention is a new and improved tilt-adjustable motor vehicle steering column including a stationary mast jacket, a tilt housing supported on the mast jacket for up and down pivotal movement, an articulated steering shaft having a lower portion rotatably supported on the mast jacket and an upper portion rotatably supported on the tilt housing, a steering hand wheel on the upper portion of the steering shaft, and a long composite balance spring preloaded in compression flexure between the tilt housing and the mast jacket. The composite balance spring consists of a hinge and a pair of short helical coil springs on opposite sides of the hinge. To preload the composite balance spring in compression flexure, the short coil springs are first arrayed as straight sides of a "V" between respective ones of a pair of spring seats on the mast jacket and the tilt housing with the hinge open. Then, when the hinge is thrust laterally to align the short coil springs on a longitudinal centerline of the composite balance spring between the spring seats, the hinge closes and the helical coil springs are compressed longitudinally without buckling. A latch automatically locks the hinge closed to reinforce the middle of the composite balance spring against lateral buckling.

DESCRIPTION OF THE PREFERRED EMBODIMENT

Figure 1:
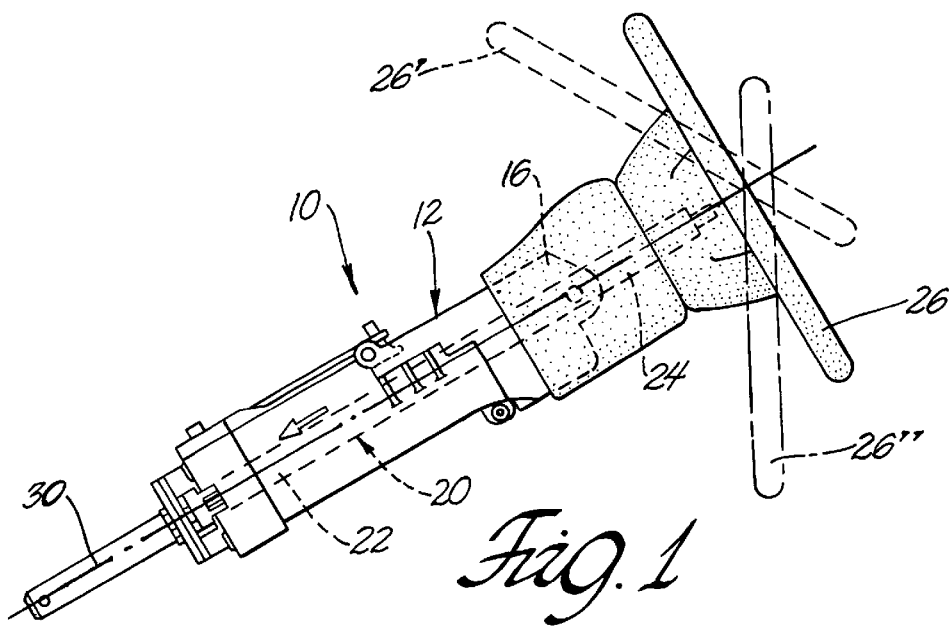
FIG. 1 is an elevational view of a tilt-adjustable motor vehicle steering column according to this invention.
Figure 2:
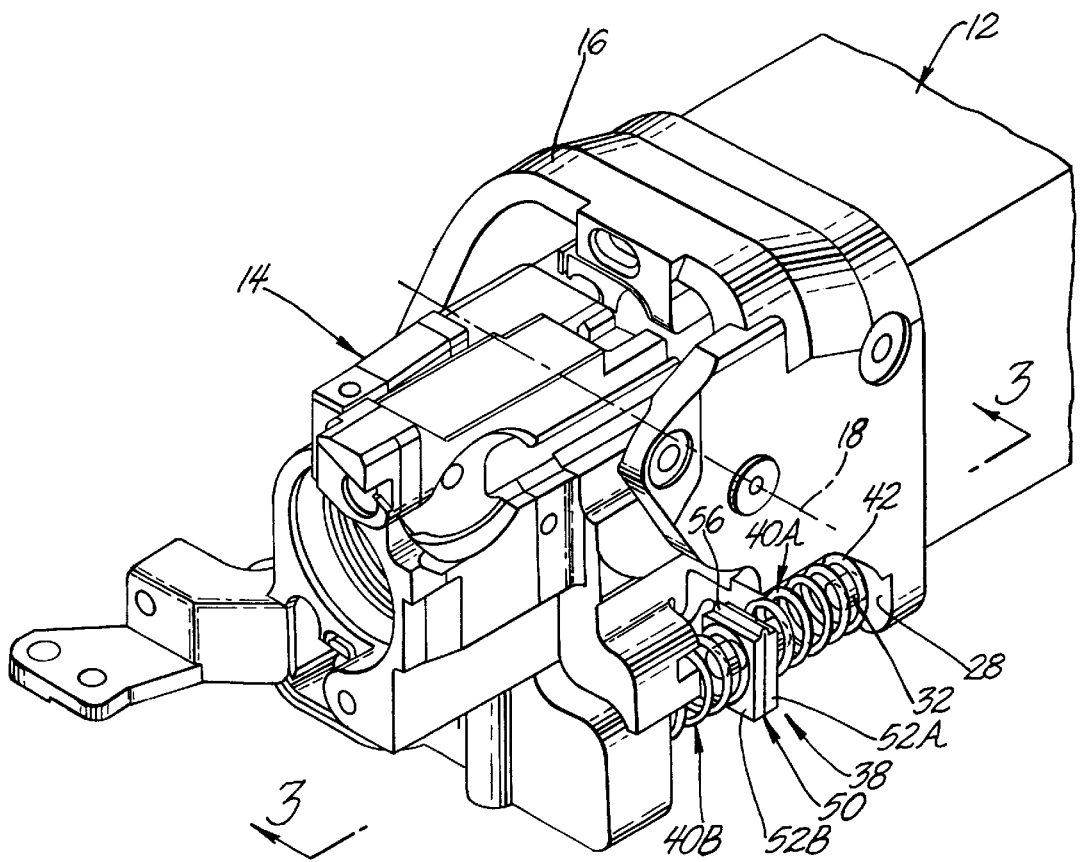
FIG. 2 is a fragmentary perspective view of the tilt-adjustable motor vehicle steering column according to this invention.
Figure 3:
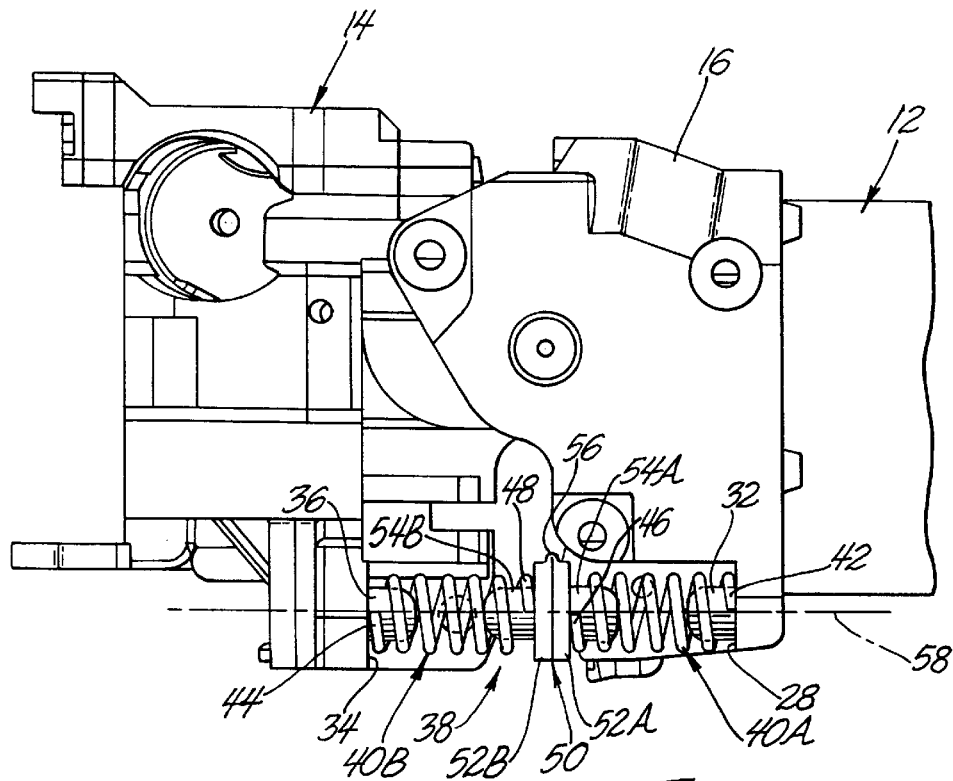
FIG. 3 is a view taken generally along the plane indicated by lines 3—3 in FIG. 2.

Referring to FIGS. 1–3, a motor vehicle steering column 10 according to this invention includes a stationary mast jacket 12 rigidly attachment to a body, not shown, of a motor vehicle and a tilt housing 14 supported on the mast jacket at an upper end 16 thereof for up and down pivotal movement about a lateral pivot axis 18, FIG. 2. An articulated steering shaft 20 includes a lower portion 22 rotatably supported on the mast jacket 12 and an upper portion 24 rotatably supported on the tilt housing 14 and connected to the lower portion by a universal coupling, not shown, at the lateral pivot axis 18. A steering hand wheel 26 is rigidly attached to the upper portion 24 of the articulated steering shaft 20 outboard of the tilt housing 14. Up and down pivotal movement of the tilt housing adjusts the vertical position of the steering hand wheel through a range of positions between by an upper limit position 26' and a lower limit position 26", FIG. 1. A tilt lock, not shown, releasably captures the tilt housing in any of a plurality of adjusted positions between the upper and the lower limit positions.

The mast jacket 12 has a flat inboard spring seat 28 thereon at the upper end 16 thereof in a plane perpendicular to a longitudinal centerline 30, FIG. 1, of the steering column. The inboard spring seat is interrupted by a raised pilot 32 perpendicular thereto. The tilt housing 14 has a flat outboard spring seat 34 thereon, FIGS. 3–4, in a plane parallel to the inboard spring seat 28 in a center position of the tilt housing, FIGS. 1–3, relative to the mast jacket. The outboard spring seat 34 is interrupted by a raised pilot 36 perpendicular thereto facing the raised pilot 32 on the inboard spring seat.

A composite balance spring 38 of the steering column 10 is disposed between the inboard and the outboard spring seats 28,34 and includes a pair of short helical coil springs 40A,40B. The helical coil spring 40A has a first end 42 around the raised pilot 32 on the inboard spring seat 28. The helical coil spring 40B has a first end 44 around the raised pilot 36 on the outboard spring seat 34. A second end 46 of the coil spring 40A faces a second end 48 of the coil spring 40B.

The composite balance spring 38 further includes a hinge 50 between the facing second ends 46,48 of the coil springs 40A,40B consisting of a pair of flat bases 52A,52B, a pair of raised pilots 54A,54B on respective ones of the flat bases 52A,52B, and a flexible strap 56 coupling the flat bases together along a pair of juxtaposed edges thereof for relative pivotal movement. The second end 46 of the coil spring 40A seats on the flat base 52A around the raised pilot 54A thereon. The second end 48 of the coil spring 40B seats on the flat base 52B around the raised pilot 54B thereon. The coil springs 40A,40B are trapped in series compression flexure between the inboard and outboard spring seats 28,34 with the flat bases 52A,52B of the hinge squeezed therebetween and react against the inboard and outboard spring seats along a longitudinal centerline 58, FIG. 3, of the composite balance spring to bias the tilt housing upward toward the upper limit position 26' of the steering hand wheel.

The method by which the composite balance spring 38 is preloaded in compression flexure between the mast jacket 12 and the tilt housing 14 constitutes an important feature of this invention and includes the steps of forming the mast jacket with the inboard spring seat 28 and the raised pilot 32 thereon and the tilt housing with the outboard spring seat 34 and the raised pilot 36 thereon. After the tilt housing is attached to the mast jacket for up and down pivotal movement, the second ends 46,48 of the coil springs 40A, 40B are hooked over the raised pilots 54A,54B on the flat bases 52A,52B of hinge 50 and the flat bases are spread apart to open the hinge. At the same time, the first end 42 of the coil spring 40A is hooked over the raised pilot 32 on the inboard spring seat 28 and the first end 44 of the coil spring 40B is hooked over the raised pilot 36 on the outboard spring seat 34. The composite balance spring is thus articulated at the hinge 50 with the coil springs 40A,40B defining respective sides of a straight-sided "V", FIG. 4, between the inboard and outboard spring seats.

The hinge 50 is thrust laterally to collapse the straight-sided V between the inboard and outboard spring seats. Concurrently, the hinge closes as the flat bases 52A,52B thereof pivot toward each while each of the coil springs 40A,40B is compressed longitudinally without buckling. When the coil springs attain alignment on the longitudinal centerline 58 of the composite balance spring, the hinge 50 is completely closed and the coil springs are trapped in series compression flexure between the inboard and the outboard spring seats 28,34. The raised pilots 32,36 on the inboard and the outboard spring seats cooperate with the raised pilots 54A,54B on the flat bases of the hinge in preventing the coil springs from escaping laterally from between the inboard and outboard spring seats during installation of the composite spring and during subsequent pivotal excursions of the tilt housing relative to the mast jacket.

Figure 4:
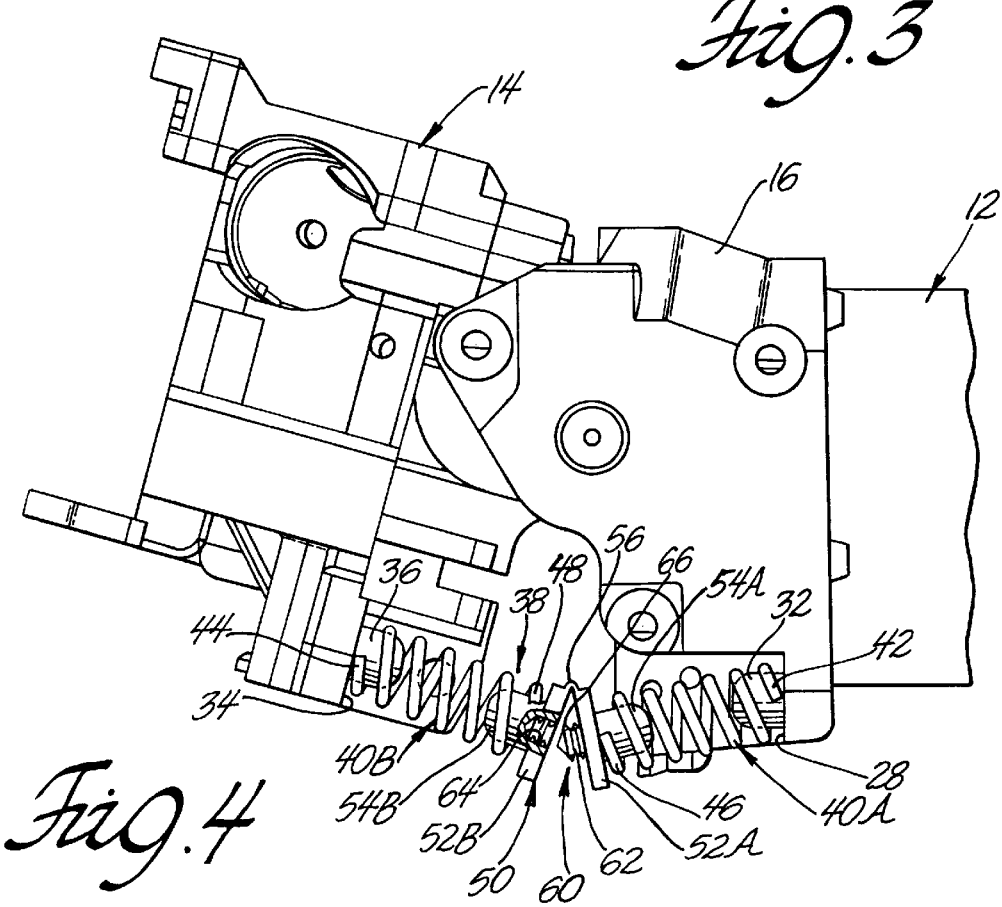
FIG. 4 is similar to FIG. 3 but showing structural elements of the tilt-adjustable motor vehicle steering column according to this invention in different relative positions.

A latch 60, FIG. 4, on the hinge 50 includes a plug 62 on the flat base 52A opposite the raised pilot 54A and a socket 64 in the flat base 52B facing the plug. The plug and the socket have a plurality of complementary barbs 66 thereon which cooperate in effectively locking the plug in the socket without interfering with penetration of the plug into the socket. As the hinge closes during collapse of the straight-sided V defined by the coil springs 40A,40B, the plug 62 enters the socket 64 and is prevented by the barbs 66 from being withdrawn so that the hinge 50 is latched closed. With the hinge latched closed, the middle of the composite balance spring is reinforced against lateral buckling during pivotal excursions of the tilt housing relative to the mast jacket.

Having thus described the invention, what is claimed is:

1. A motor vehicle steering column including
   a stationary mast jacket having an inboard spring seat thereon,
   a tilt housing supported on the stationary mast jacket at an upper end thereof for up and down pivotal movement having an outboard spring seat thereon facing the inboard spring seat on the mast jacket,
   a steering hand wheel rotatably supported on the tilt housing, and
   a balance spring preloaded in compression flexure between the inboard spring seat and the outboard spring seat biasing the tilt housing upward toward an upper limit position of the steering hand wheel,
   characterized in that the balance spring is a composite balance spring comprising:
   a hinge having a pair of flat bases connected to each other for relative pivotal movement,
   a first helical coil spring seated at a first end thereof on the inboard spring seat and at a second end thereof on a first one of the pair of flat bases of the hinge, and
   a second helical coil spring seated at a first end thereof on the outboard spring seat and at a second end thereof on a second one of the pair of flat bases of the hinge,
   the hinge being closed with the pair of flat bases thereof squeezed together between the second ends of the first and the second helical coil springs when the first and the second helical coil springs are aligned on a longitudinal centerline of the composite balance spring in series compression flexure between the inboard spring seat and the outboard spring seat.

2. The motor vehicle steering column recited in claim 1 further comprising:
   a raised pilot on the inboard spring seat surrounded by the first end of the first helical coil spring,
   a raised pilot on the outboard spring seat surrounded by the first end of the second helical coil spring,
   a raised pilot on the first one of the pair of flat bases of the hinge surrounded by the second end of the first helical coil spring, and
   a raised pilot on the second one of the pair of flat bases of the hinge surrounded by the second end of the second helical coil spring.

3. The motor vehicle steering column recited in claim 2 further comprising:
   a latch means on the hinge operative to lock the hinge means closed when the first and the second helical coil springs are aligned on the longitudinal centerline of the composite balance spring in series compression flexure between the inboard spring seat and the outboard spring seat.

4. The motor vehicle steering column recited in claim 3 wherein the latch means comprises:
   a plug on the first one of the pair of flat bases of the hinge,
   a socket in the second one of the pair of flat bases of the hinge facing the plug and operative to receive the plug when the hinge is closed, and
   a plurality of barb means on the plug and in the socket operative to resist dislodgment of the plug from the socket without interfering with entry of the plug into the socket thereby to lock the hinge closed.

5. A method of preloading a balance spring in compression flexure between a stationary mast jacket of a tilt-adjustable motor vehicle steering column and a tilt housing supported on the mast jacket for up and down pivotal movement comprising the steps of:
   forming an inboard spring seat on the mast jacket,
   forming an outboard spring seat on the tilt housing facing the inboard spring seat,
   forming a composite balance spring consisting of a first helical coil spring and a second helical coil spring and a hinge between the first and the second helical coil springs,
   opening the hinge so that the composite balance spring is V-shaped with the first and the second helical coil springs defining respective ones of a pair of straight sides thereof, interposing the V-shaped balance spring between the mast jacket and the tilt housing with a first end of the first helical coil spring bearing against the inboard spring seat and a first end of the second helical coil spring bearing against the outboard spring seat, and thrusting the hinge laterally between the inboard and the outboard spring seats to compress each of the first and the second helical coil springs without buckling until the hinge is closed with the first and the second helical coil springs aligned on a longitudinal centerline of the composite balance spring in series compression flexure between the inboard and the outboard spring seats.

6. The method recited in claim 5 of preloading a balance spring in compression flexure between a stationary mast jacket of a tilt-adjustable motor vehicle steering column and a tilt housing supported on the mast jacket for up and down pivotal movement further comprising the steps of:

forming a raised pilot on the inboard spring seat surrounded by the first end of the first helical coil spring, forming a raised pilot on the outboard spring seat surrounded by the first end of the second helical coil spring, forming the hinge with a pair of flat bases connected to each other for relative pivotal movement, forming a raised pilot on a first one of the pair of flat bases of the hinge surrounded by a second end of the first helical coil spring, and forming a raised pilot on a second one of the pair of flat bases of the hinge surrounded by a second end of the second helical coil spring.

7. The method recited in claim 6 of preloading a balance spring in compression flexure between a stationary mast jacket of a tilt-adjustable motor vehicle steering column and a tilt housing supported on the mast jacket for up and down pivotal movement further comprising the steps of: p1 forming a latch means on the hinge operative to lock the hinge closed when the hinge is closed by being thrust laterally between the inboard and the outboard spring seats.

8. The method recited in claim 6 of preloading a balance spring in compression flexure between a stationary mast jacket of a tilt-adjustable motor vehicle steering column and a tilt housing supported on the mast jacket for up and down pivotal movement wherein the step of forming a latch means on the hinge comprises the steps of:

forming a plug on the first one of the pair of flat bases of the hinge, forming a socket in the second one of the pair of flat bases of the hinge facing the plug and operative to receive the plug when the hinge is closed, and forming a plurality of barb means on the plug and in the socket operative to resist dislodgment of the plug from the socket without interfering with entry of the plug into the socket.

* * * * *